US009700090B2

(12) United States Patent
Canonico et al.

(10) Patent No.: US 9,700,090 B2
(45) Date of Patent: Jul. 11, 2017

(54) BALLISTIC PROTECTION TEXTILE CONSTRUCTION AND METHOD THEREFOR USING A TETRA AXIAL WEAVE

(71) Applicant: SAATI S.P.A., Appiano Gentile (CO) (IT)

(72) Inventors: Paolo Canonico, Appiano Gentile (IT); Paolo Gariboldi, Appiano Gentile (IT)

(73) Assignee: SAATI S.P.A., Appiano Gentile (CO) (IT)

( * ) Notice: Subject to any disclaimer, the term of this patent is extended or adjusted under 35 U.S.C. 154(b) by 0 days.

(21) Appl. No.: 14/768,720

(22) PCT Filed: Feb. 20, 2014

(86) PCT No.: PCT/IB2014/000182
§ 371 (c)(1),
(2) Date: Aug. 18, 2015

(87) PCT Pub. No.: WO2014/128548
PCT Pub. Date: Aug. 28, 2014

(65) Prior Publication Data
US 2016/0000163 A1    Jan. 7, 2016

(30) Foreign Application Priority Data
Feb. 22, 2013   (IT) .............................. MI2013A0258

(51) Int. Cl.
*A41D 31/00* (2006.01)
*D03D 13/00* (2006.01)
(Continued)

(52) U.S. Cl.
CPC .......... *A41D 31/0061* (2013.01); *B32B 3/266* (2013.01); *B32B 5/12* (2013.01);
(Continued)

(58) Field of Classification Search
CPC .... A61K 38/08; C07K 14/47; C07K 14/4747; C07K 14/82; C07K 7/06; A41D 31/0061;
(Continued)

(56) References Cited

U.S. PATENT DOCUMENTS

2011/0240168 A1   10/2011   Shahkarami
2012/0024139 A1   2/2012   Stewart

FOREIGN PATENT DOCUMENTS

EP          0805332 A2    11/1997

OTHER PUBLICATIONS

International Search Report dated Jun. 5, 2014.

*Primary Examiner* — Arti Singh-Pandey
(74) *Attorney, Agent, or Firm* — Hedman & Costigan, P.C.; James V. Costigan; Kathleen A. Costigan

(57) ABSTRACT

A novel multiple orientation construction for the ballistic protection, the process for making it and the main ballistic results obtained thereby. Said construction comprises at least a textile element and one or more thermoplastic or thermosetting based elements. The first textile element (1) comprises textile fibers. The second element (2) may comprise thermoplastic, thermosetting, rubber or polymeric elastomer based matrix arrangements or thermoplastic films for adjusting the textile construction characteristics according to the intended applications and for assisting in reducing bullet impact damages. The above elements jointly cooperate in absorbing and spreading a bullet impact stress.

12 Claims, 2 Drawing Sheets

(51) Int. Cl.
*F41H 1/02* (2006.01)
*F41H 5/04* (2006.01)
*D03D 1/00* (2006.01)
*B32B 5/12* (2006.01)
*B32B 5/26* (2006.01)
*B32B 3/26* (2006.01)
*D06B 1/00* (2006.01)
*D06C 15/00* (2006.01)

(52) U.S. Cl.
CPC .............. *B32B 5/26* (2013.01); *D03D 1/0052* (2013.01); *D03D 13/00* (2013.01); *D06B 1/00* (2013.01); *D06C 15/00* (2013.01); *F41H 1/02* (2013.01); *F41H 5/0478* (2013.01); *B32B 2260/023* (2013.01); *B32B 2260/046* (2013.01); *B32B 2262/0253* (2013.01); *B32B 2262/0261* (2013.01); *B32B 2307/558* (2013.01); *B32B 2571/02* (2013.01); *D10B 2331/021* (2013.01)

(58) Field of Classification Search
CPC ........ B32B 2260/023; B32B 2260/046; B32B 2262/0253; B32B 2262/0261; B32B 2307/558; B32B 2571/02; B32B 3/266; B32B 5/12; B32B 5/26; D03D 13/00; D03D 1/0052
See application file for complete search history.

US 9,700,090 B2

BALLISTIC PROTECTION TEXTILE CONSTRUCTION AND METHOD THEREFOR USING A TETRA AXIAL WEAVE

BACKGROUND OF THE INVENTION

The present invention relates to a textile construction particularly applicable for providing ballistic protection and a method for making it.

More specifically, the present invention relates to a ballistic protection textile construction of the so-called "soft armor" and "hard armor" types.

The present invention is particularly applicable for making ballistic protection devices, either of hybrid or monolithic type, especially soft protection devices.

As is known, the capability of a textile fabric of preventing a bullet or fragment thereof, or a pointed implement such as a knife, from penetrating said fabric essentially depends on the nature of the fabric textile fibers, weave and mass per is unit of area (areal density).

Thus, providing a ballistic protection small weight, highly comfortable, and improved performance fabric has always been the main issue in several ballistic protecting applications.

In an increasing number of applications, improved ballistic protection fibers are used in different multi-axial arrangements for making novel or improving existing fabric materials, because of their improved ballistic protection performance.

Multi-axial articles are manufactured by means of textile processes performed by dedicated looms.

In fact, such an article, including a plurality of like or different textile or other material layers, would allow, its areal density being the same, the penetrating bullet energy to be quickly and reliably dispersed, thereby stopping the bullet and preventing it from penetrating the user's body.

In this connection, it is also known that the ballistic protection fabric material forming reinforcement fibers usually comprise para-aramide and UHMWPE fibers adapted to efficiently absorb a penetrating bullet stress they are subjected to.

In multi-axial articles such fibers are woven according to different weaving axes and bound to one another by a fiber stitching process.

Said reinforcement fibers and weaving processes provide a fabric having flexibility and draping features much improved in comparison with standard textile fabrics and weaving methods, thereby greatly enhancing the comfort of a user wearing the ballistic protection article.

A prior overlapping method, in which different orientation, high toughness fibers, such as para-aramide, UHMWPE and carbon fibers, are processed to provide multi-directional ballistic protection articles is also well known.

Said overlapping differently oriented fiber articles have enhanced mechanical characteristics allowing an improved load and stress spreading as well as a correspondingly improved bullet impact energy spreading.

The above prior overlapping method comprises the step of overlapping, in a controlled manner, the fiber layers, up to a maximum number of 4, with variable overlapping angles, theoretically from 0° to 90°, and is carried out in the so-called "multi-axial looms".

In the above prior method, the different fiber planes or layers are bound, in a final step, by a longitudinal stitching, thereby providing a "multi-axial" fabric.

Said multi-axial looms may further comprise auxiliary tools to properly spread a thermoplastic matrix film, a textile matrix mat or web on the individual fabric layers or on a surface of said fabric.

The method also comprises further fabric processing steps, such as a fabric thermosetting, thermoplastic or rubberized matrix impregnating step to broaden the ballistic protection article applications.

SUMMARY OF THE INVENTION

Thus, the aim of the present invention is to provide such a novel and improved multiple orientation ballistic protection textile construction.

Within the scope of the above mentioned aim, a main object of the present invention is to provide such a ballistic protection textile construction which, owing to its novel structural features, is very reliable and safe in operation.

According to one aspect of the present invention, the above mentioned aim and objects, as well as yet other objects, which will become more apparent hereinafter, are achieved by a ballistic protection textile construction and a method for making it, as claimed in the appended claims.

The document US 2011/240168, considered the most pertinent prior art document, discloses a multi-layer ballistic woven fabric, comprising: a. an upper woven layer having upper warp yarns and upper weft yarns that are interwoven together to form the upper woven layer, the upper warp yarns and upper weft yarns being ballistic yarns; b. a lower woven layer having lower warp yarns and lower weft yarns that are interwoven together to form the lower woven layer, the lower warp yarns and lower weft yarns being ballistic yarns, wherein at least some of the upper yarns and lower yarns are offset from each other so as to overlap by between 10% and 95%; and c. a plurality of securing yarns, each securing yarn interwoven with at least some of the upper yarns and some of the lower yarns so as to secure the upper and lower woven layers together, the securing yarns being of significantly smaller denier than the warp yarns and weft yarns and having significantly lower tenacities and tensile moduli than the warp yarns and weft yarns; d. wherein the multi-layer ballistic woven fabric is formed by interweaving the securing yarns with the warp yarns and weft yarns as the upper woven layer and lower woven layer are made.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative but not limitative example, in the accompanying drawings, where.

DESCRIPTION OF THE PREFERRED EMBODIMENTS

Figure 1:
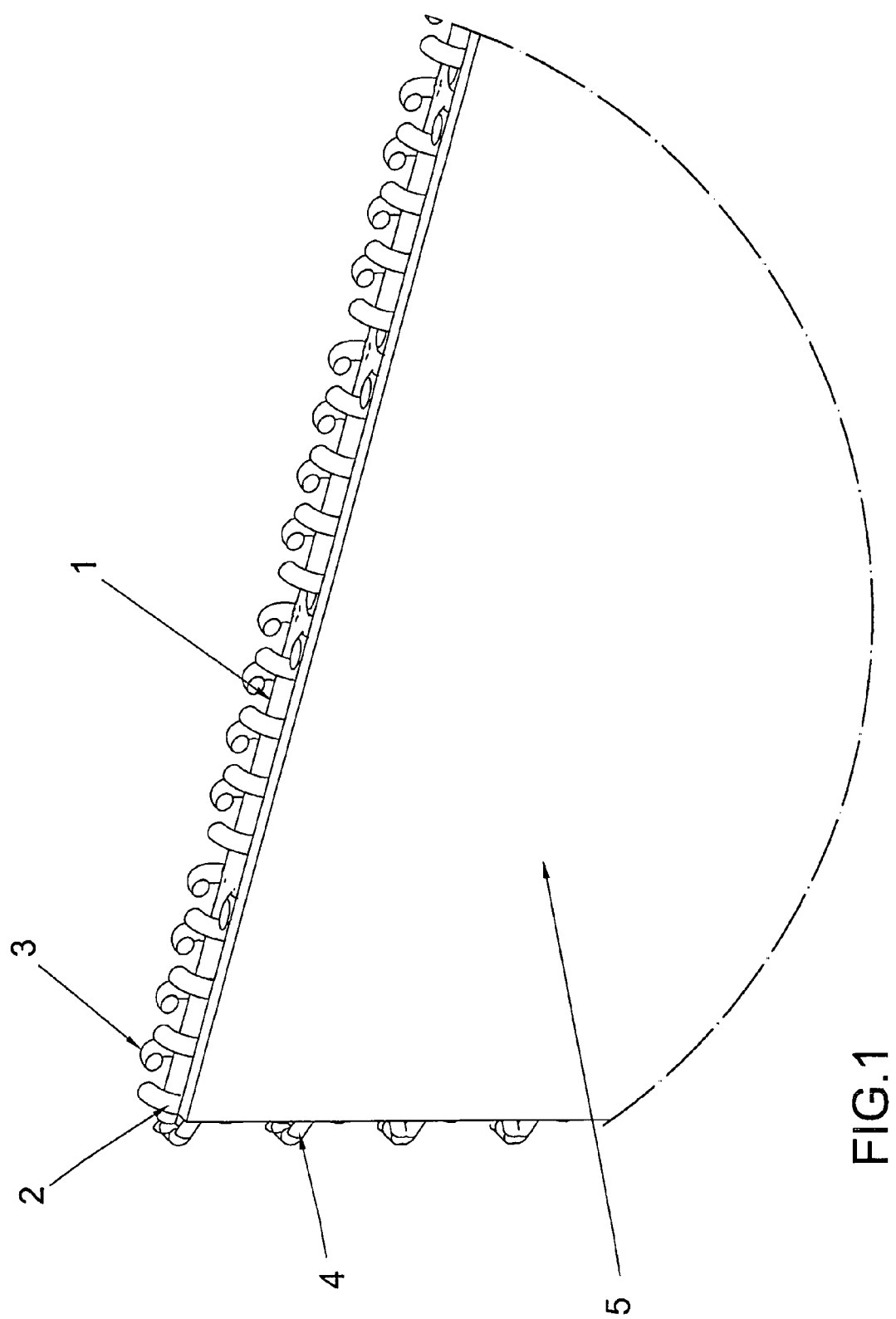
FIG. 1 is a partially cross-sectioned perspective view of a front portion of the ballistic protection textile construction according to the invention.
Figure 2:
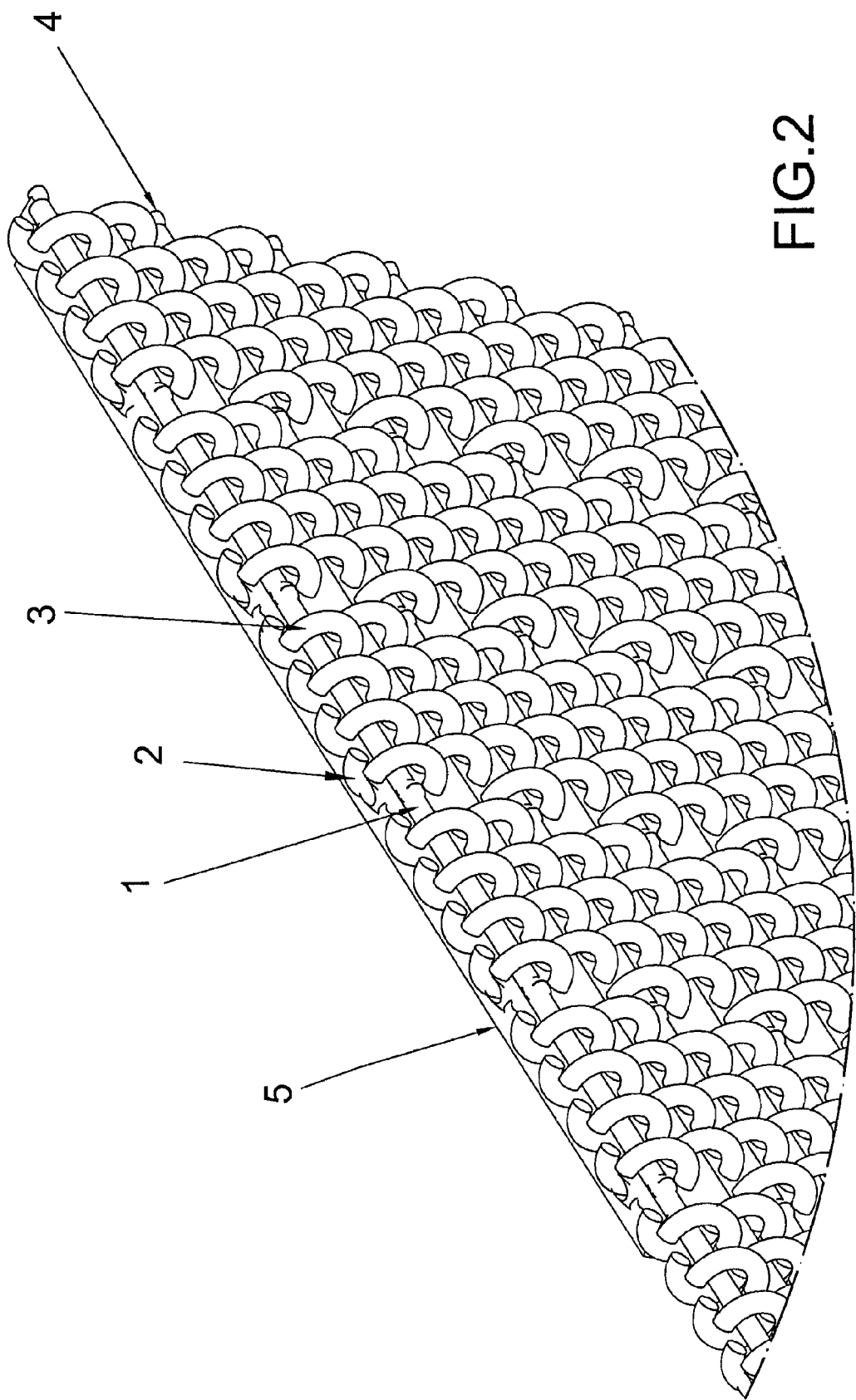
FIG. 2 is a partially cross-sectioned perspective view of a rear portion of the inventive ballistic protection textile construction.

The ballistic protection textile construction according to the present invention is made by a novel and inventive weaving process, performed on a tetra-axial loom, wherein a first element, that is the fibers arranged in beams, are at first so interwoven as to provide a longitudinal fiber plane or layer (the warp fibers), a cross fiber plane or layer (the weft fibers) and two further fiber planes or layers with opposite angular arrangements, the orientation of which may theoretically change from 10° to 80°.

Differently from a standard multi-axial weaving process, the inventive method provides a ballistic protection article with an article structure or construction similar to that of a conventional fabric including mutually alternating weft and warp yarns or threads, thereon a cross arrangement of differently angled additional fibers is nested.

In particular, the inventive method provides a step of alternately arranging diagonal fibers with a set fiber pitch to define a position at which, with respect to the weft and warp yarns, the cross arrangement is formed, with a preset fiber binding angle.

The fabric warp may comprise yarns or threads of a para-aramide matrix, such as Kevlar®, Twaron®, or the like commercially available materials, or UHMWPE yarns, such as Spectra®, Dyneema®, Tensylon®, or the like commercially available materials, or other high toughness material fibers.

In this connection it should be apparent that the linear density of said yarns may be any suitable density as required.

The fabric weft, in turn, may comprise para-aramide matrix yarns or threads, such as Kevlar®, Twaron®, or other commercially available materials, or fibers having a UHMWPE matrix, such as Spectra®, Dyneema®, Tensylon®, or other high toughness fibers.

The linear density of said weft yarns may be likewise any suitable density as required.

The opposite angled planes may also comprise the same above yarn types.

The above article may further comprise additional processing elements, indicated by the reference number 2, such as thermoplastic, rubber or elastomeric polymer based matrixes or a combination thereof, or laminated with different thermoplastic films such as PE, PU, PP, PA, EVA, or any desired thermoplastic materials adapted to be extruded to a film form.

The above additional elements will facilitate a spreading of the bullet impact energy through the underlying support, due to a viscoelastic deformation, fiber breaking or fibrillation.

The above impregnation, in particular, allows one or more support layers, comprising the above mentioned elements 1 and 2, to be compacted by pressing or molding.

Ballistic data clearly show that a construction thus made does not provide results comparable with those achieved by using non-processed individual layers.

In fact, it has been found that said polymeric matrix tends to depress the impact energy absorbing capability.

The following illustrative and non limitative Examples relate to experimental tests carried out by the Applicant.

The disclosed tests being related to packets having a weight from 5.10 kg/m² to 5.2 kg/m², depending on the individual layer weights.

Said packets have been applied to a plasticine block for evaluating the trauma of bullets fired with a firing speed as defined by the NIJ 0101.06 standard, by using bullets of Cal. 9 mm FMJ RN type and 44 Mag. JHC type.

In particular, end values achieved by the two calibers for different solutions are hereinbelow shown.

Example 1

38 layers of a homogeneous tetra-axial fabric constituted by a 440 dtex yarn, both in the weft and warp direction, and in the axes angled with a 5/1 binding, a weft of 12 threads/cm and a warp of 12 threads/cm.

The trauma data and number of perforated layers are shown in the following Table:

| Panel weight Kg/m² | Trauma at 0° (mm) | Trauma at 30° (mm) | Perforated layers (No) | % perforated layers (%) |
|---|---|---|---|---|
| | | Cal 9 mm FMJ RN | | |
| 5.1 | 37 | 29 | 14 | 37 |
| | | Cal44 mag JHC | | |
| 5.1 | 60 | 43 | 16 | 42 |

Example 2

35 layers of a homogeneous tetra-axial fabric constituted by a 440 dtex yarn, both in the weft and warp direction, and in the axes angled with a 5/1 binding, a weft of 14 threads/cm and a warp of 12 threads/cm.

The trauma data and number of perforated layers are shown in the following Table:

| Panel weight Kg/m² | Trauma at 0° (mm) | Trauma at 30° (mm) | Perforated layers (No) | % perforated layers (%) |
|---|---|---|---|---|
| | | Cal 9 mm FMJ RN | | |
| 5.1 | 37 | 27 | 15 | 43 |
| | | Cal44 mag JHC | | |
| 5.1 | 68 | 35 | 15 | 43 |

Example 3

35 layers of a tetra-axial fabric constituted by a 440 dtex yarn, both in the weft and warp direction, the angled axes comprising a 670 dtex yarn with a 5/1 binding, a weft of 12 threads/cm and a warp of 12 threads/cm.

The trauma data and number of perforated layers are shown in the following Table:

| Panel weight Kg/m² | Trauma at 0° (mm) | Trauma at 30° (mm) | Perforated layers (No) | % perforated layers (%) |
|---|---|---|---|---|
| | | Cal 9 mm FMJ RN | | |
| 5.2 | 39 | 27 | 14 | 40 |
| | | Cal44 mag JHC | | |
| 5.2 | 63 | 42 | 10 | 29 |

Example 4

29 layers of a tetra-axial fabric constituted by a 440 dtex yarn, both in the weft and warp direction, with angled axes comprising a 930 dtex yarn with a 5/1 binding, a weft of 12 threads/cm and a warp of 12 threads/cm.

The trauma data and number of perforated layers are shown in the following Table:

| Panel weight Kg/m² | Trauma at 0° (mm) | Trauma at 30° (mm) | Perforated layers (No) | % perforated layers (%) |
|---|---|---|---|---|
| | | Cal 9 mm FMJ RN | | |
| 5.2 | 38 | 28 | 17 | 59 |
| | | Cal44 mag JHC | | |
| 5.2 | 69 | 38 | 19 | 66 |

Example 5

A system comprising 10 layers of Style 390+4 UD UHMWPE layers+4 tetra-axial fabric layers constituted by a 440 dtex yarn, both in the weft and warp direction, the angled axes comprising a 930 dtex yarn with a 5/1 binding, a weft of 12 threads/cm and a warp of 12 threads/cm+4 UD UHMWPE layers+7 AS400S layers.

The trauma data and number of perforated layers are shown in the following Table:

| Cal44 mag JHC | | | | |
|---|---|---|---|---|
| Panel weight Kg/m² | Trauma at 0° (mm) | Trauma at 30° (mm) | Perforated layers (No) | % perforated layers (%) |
| 5.2 | 41 | 37 | 10 | 35 |

Example 6

A system comprising 3 UD UHMWPE layers+10 Style 390 layers+1 UD UHMWPE layer+8 tetra-axial fabric layers constituted by a 440 dtex yarn, both in the weft and warp direction, with angled axes comprising a 930 dtex yarn with a 5/1 binding, a weft of 12 threads/cm and a warp of 12 threads/cm+6 UD UHMWPE layers+4 AS400S layers.

The trauma data and number of perforated layers are shown in the following Table:

| Cal44 mag JHC | | | | |
|---|---|---|---|---|
| Panel weight Kg/m² | Trauma at 0° (mm) | Trauma at 30° (mm) | Perforated layers (No) | % perforated layers (%) |
| 5.2 | 42 | 36 | 5 | 15 |

In practicing the invention, the specific details may be different both with respect to the single packet forming layer, and with respect to the nature of the elements constituting a single packet.

The invention claimed is:

1. A method for making a ballistic protection textile construction, wherein said method comprises providing a tetra-axial loom for simultaneously weaving according to four directrix lines and weaving on said loom a textile support element (1) wherein the weft and warp fibers are further interwoven with fibers fed from two axes having opposite orientation angles from 10° to 80°, thereby said ballistic protection textile construction is similar to that of a conventional fabric including a mutually alternating weft and warp yarns or fibers thereon a cross arrangement of differently angled additional yarns or fibers is arranged.

2. A method, according to claim 1, wherein said method further comprises a step of providing a second non-textile element (2), including thermoplastic, rubber or elastomeric polymer based matrix arrangements for stabilizing the textile construction and reducing damages due to a bullet impact.

3. A method, according to claim 1, wherein said method further comprises a stabilizing process consisting of a partial melting of a thermoplastic matrix by calendering or hot laminating, or by IR lamps having operating parameters depending on a thermoplastic material used.

4. A method, according to claim 1, wherein said method comprises a step of impregnating said textile construction by a thermoplastic, rubber or elastomeric polymer based matrix or a combination thereof, or laminated with thermoplastic films, selected from PE, PU, PP, PA, EVA or any thermoplastic materials adapted to be extruded to a film form.

5. A method, according to claim 1, wherein said method further comprises the step of compacting by molding one or more layers of said textile support, said layers being constituted by said first and second elements (1, 2).

6. A ballistic protection textile construction made by a method according to claim 1 wherein said textile construction comprises a support element (1) including weft and warp fibers which are further interwoven with interweaving fibers fed from two axes having different orientation angles from 10° to 80°.

7. A textile construction, according to claim 6, wherein said textile construction comprises a second non-textile element (2) including thermoplastic, rubber or elastomeric polymer based matrix arrangements, for stabilizing said construction and reducing bullet impact damages.

8. A construction, according to claim 6, wherein said textile element comprises either para-aramide matrix yarns selected from the group of aromatic polyamides, para-aramids, or UHMWPE matrix yarns.

9. A construction, according to claim 7, wherein said second non-textile element comprises a thermoplastic, thermosetting, rubber or elastomeric polymer based matrix arrangement or a combination thereof, or laminated with different thermoplastic films selected from PE, PU, PP, PA, EVA or any thermoplastic material adapted to be extruded to a film form.

10. A construction, according to claim 6, wherein said elements (1, 2) are at least partially impregnated or laminated.

11. A protective ballistic article, wherein said article comprises a ballistic protection textile construction according to claim 6.

12. A protective ballistic article, according to claim 11, wherein said article comprises at least a ballistic protection textile construction according to claim 6 combined with other constructions.

* * * * *